3,036,045
POLYMER COMPOSITIONS AND IMPROVED PROCESS FOR VULCANIZATION OF RUBBERY HYDROXY-CONTAINING POLYMERS WITH POLYISOCYANATES
James N. Short, Borger, and Paul W. Solomon, Phillips, Tex., assignors to Phillips Petroleum Company, a corporation of Delaware
No Drawing. Filed July 5, 1955, Ser. No. 520,116
2 Claims. (Cl. 260—77.5)

This invention relates to the production of polymers. In one aspect it relates to a process for vulcanizing or curing hydroxy-containing polymers and to the vulcanized polymers produced thereby. In another aspect it relates to a novel vulcanizing agent or curative which decreases the occurrence of premature vulcanization. In another aspect it relates to a millable and vulcanizable polymeric composition.

By the vulcanization or curing of synthetic polymers and natural rubber, the physical characteristics, such as tensile strength, abrasion resistance, and heat build-up, may be greatly influenced, as is well known in the art. Various vulcanizing agents or curatives and other additives are mixed with the polymeric compositions prior to the actual step of vulcanization in order to influence these physical characteristics. The vulcanizing agents chemically react with the polymeric composition during vulcanization, and the nature of some of the reactions is known while the nature of other reactions is uncertain.

In the past, polyisocyanates have been employed in the vulcanization or curing of hydroxy-containing polymers. However, when these vulcanizing agents or curatives are employed per se the vulcanization or curing occurs rapidly and at relatively low temperatures. Such procedure often results in premature vulcanization, or "scorching," of the compounded stock prior to the period in the processing cycle when vulcanization is desired. This scorching prevents (in many instances) the further milling or working of the polymeric composition.

We have now found that vulcanization of hydroxy-containing polymers can be effected without scorching by employing as a novel vulcanizing agent or curative the reaction product of a polyisocyanate with an active hydrogen-containing compound.

Accordingly, an object of this invention is to provide a process for vulcanizing hydroxy-containing polymeric materials and to provide novel polymeric materials produced thereby.

Another object is to provide a novel vulcanizing agent comprising the reaction product of a polyisocyanate with an active hydrogen-containing compound without the tendency for a polymeric composition containing said agent to exhibit that premature vulcanization or scorching which occurs when polyisocyanates are employed per se as the vulcanizing agent.

A further object is to produce a millable and vulcanizable hydroxy-containing polymeric composition.

A still further object is to produce novel polymeric materials of desirable physical characteristics.

Further objects and advantages of our invention will become apparent, to one skilled in the art, from the accompanying discussion and disclosure.

It is known that certain compounds which contain active hydrogen react with polyisocyanates to form relatively stable reaction products. We have now found that because of the reactivity of these reaction products with hydroxy groups these reaction products may be advantageously employed in the vulcanization of hydroxy-containing polymers not only for the purpose of yielding polymeric products having desirable physical characteristics but also to prevent premature vulcanization of the polymeric composition. In the practice of this invention, the reaction products to be employed as vulcanizing agents or curatives can be prepared by the well known reaction of an isocyanate with a compound containing active hydrogen. In particular, we have found it advantageous to use at least a stoichiometric amount, and, if desired, an excess, of the active hydrogen-containing compounds per mol of the polyisocyanate. The polyisocyanate is caused to react with the active hydrogen-containing compound at an appropriate temperature. The temperature and the time of reaction will be dependent upon the activity of the reactants. The reaction products so obtained are stable at room temperature and may be handled without difficulty.

The polyisocyanates and the active hydrogen-containing compounds can be aliphatic, cycloaliphatic, or aromatic, and they may contain other reactive groups. While we have found that organic polyisocyanates in general may be used in the practice of this invention, the diisocyanates are to be preferred because of their availability and ease of preparation. Representative polyisocyanates useful in the practice of this invention include: m-phenylene diisocyanate; p-phenylene diisocyanate; hexamethylene diisocyanate; m-tolylene diisocyanate; p-tolylene diisocyanate; p,p'-diphenylmethane diisocyanate; p,p'-diphenyl diisocyanate; diphenyl-3,3'-dimethyl-4,4'diisocyanate; 2-chloropropane diisocyanate-1,3; diphenyl-3,3'-dimethoxy-4,4'-diisocyanate; 2,2'-diisocyanate diethyl ether; 3-(diethylamine)-pentane-diisocyanate-1,5; 1,5-naphthylene diisocyanate; pentamethylene diisocyanate; tetramethylene diisocyanate; octamethylene diisocyanate; ethylene diisocyanate; propylene-1,2-diisocyanate; cyclohexylene-1,2-diisocyanate; xylylene-1,4-diisocyanate; benzene-1,2,4-triisocyanate; and the like.

Representative active hydrogen-containing compounds useful in the practice of this invention include: phenol; o-, m-, and p-cresol; di-n-butylamine; diphenylamine; piperidine; morpholine; phenyl-beta-naphthylamine; N-methyl-acetamide; N-ethylvaleramide; N-methyl-2-naphthamide; diacetamide; acetanilide; N-phenylbenzamide; succinimide; phthalimide; malonimide; and the like.

The polymeric compositions which can be vulcanized or cured by the practice of this invention can be prepared by well known procedures from mixtures of conjugated dienes and hydroxy-containing monomers or from mixtures of hydroxy-containing monomers and certain other copolymerizable monomers having an active vinylidene group, e.g., $CH_2=C<$. Representative hydroxy-containing monomers include: 2-phenyl-4-hydroxy-1-butene; 2-(4 - chlorophenyl) - 4 - hydroxy-1-butene; 2-(2-bromo-4-methylphenyl) - 4 - hydroxy - 1 - butene; 2-(2-methoxyphenyl) - 4-hydroxy-1-butene; 2-(2,4,6-trimethylphenyl)-4-hydroxy-1-butene; and the like. Other hydroxy-containing monomers include: dimethylethynylcarbinol; hydroxyethyl arcylates and methacrylates; hydroxyethylstyrene; 2-hydroxyethyl - 5 - vinylpyridine; N-hydroxyethylacrylamide; N-methylolacrylamide and the like.

Representative conjugated dienes copolymerizable with the hydroxy-containing monomers generally include those containing from 4 to 8 carbon atoms per molecule as exemplified by: 1,3-butadiene; isoprene; 2,3-dimethyl-1,3-butadiene; piperylene; 2-methyl-1,3-pentadiene; chloroprene; 2-methoxy-1,3-butadiene; 2-ethoxy-1,3-butadiene; 2-cyano-1,3-butadiene; 2-methyl - 3 - cyano-1,3-butadiene; and the like.

Other representative copolymerizable monomers containing an active vinylidene group include the aryl olefins, esters of acrylic and substituted acrylic acids, nitriles, amides, ketones, ethers, and halides. Specific examples useful in the practice of this invention include: styrene; nuclear substituted alkyl styrenes; para-chlorostyrene; para-methoxystyrene; methyl acrylate; ethyl acrylate; methyl methacrylate; ethyl methacrylate; butyl methacrylate; acrylonitrile; methacrylonitrile; methacrylamide; methyl isopropenyl ketone; methyl vinyl ketone; methyl vinyl ether; vinyl acetate; vinyl chloride; vinylidene chloride; vinylfurane; vinylcarbozole; vinylacetylene; 2-methyl-5-vinylpyridine; and the like.

While we have found that practice of this invention is particularly applicable to the processing of a 2-phenyl-4-hydroxy-1-butene/1,3-butadiene rubbery copolymer, it is obviously not limited thereto and other polymeric materials herein disclosed are within the scope of this invention.

In the preparation of rubbery copolymers of hydroxy-containing monomers and conjugated dienes, from 50 to 98 parts by weight of conjugated diene is employed per 100 parts by weight of monomeric material. Such hydroxy-containing monomer is employed in an amount sufficient to yield a polymer containing at least 0.009 mol, and more preferably, at least 0.025 mol of hydroxy group per 100 grams of rubbery copolymer. It is necessary that at least 0.009 mol of hydroxy group be present in order that the desired vulcanization with the reaction products of polyisocyanates with active hydrogen-containing compounds be obtained. As long as the requisite amounts of the hydroxy-containing monomer and the conjugated diene are present in the initial charge, as hereinbefore described, the various amounts of the other aforementioned copolymerizable materials containing an active vinylidene group can also be present.

The amount of the vulcanizing agent employed in the practice of this invention is dependent upon the particular compounding recipe, the particular reaction product employed, the extent of vulcanization or curing desired, and other considerations which will be evident to those in the art and may be readily determined according to the particular polymeric product desired. Generally, however, in most instances, the amount of vulcanizing agent is in the range between 0.13 and 5 mols, preferably in the range between 0.35 and 3 mols, per mol of hydroxy group in the polymer. The vulcanizing agent useful in the practice of this invention may be incorporated into the polymeric composition along with other additives such as fillers, softeners, plasticizers, etc., by any suitable mixing procedure such as during milling.

The vulcanizing or curing temperature employed in the practice of this invention is generally that which is regarded in the range for rubber processing. Ordinarily, this can be in the range between 200° and 400° F. By varying the composition of the vulcanizing agent, curing conditions may be varied according to known procedures to obtain the desirable physical properties in the finished polymeric product. The curing time will depend upon the curing temperature and the particular vulcanizing agent employed. Generally this time will be at least 10 minutes and may be 48 hours or longer. The curing is continued until the vulcanizate has the desired physical properties.

Sulfur is frequently regarded as having a deleterious effect on a rubber vulcanizate, particularly as regards aging characteristics. The present invention makes available to the art a process whereby finished polymeric products having good physical properties can be obtained in the absence of sulfur in the compounding recipe. The polymeric materials obtained by the practice of this invention are non-corrosive to metals and, therefore, have advantages over sulfur-containing polymers for many applications. It is to be understood, however, that the use of sulfur and other additives such as plasticizers, antioxidants, reinforcing agents, vulcanization accelerators, etc., can be employed in the compounding recipe. However, these ingredients are not necessary and in some respects it is advantageous if they are omitted.

Advantages of this invention are illustrated by the following examples. The reactants and their proportions and the other specific ingredients of the recipes are presented as being typical and should not be construed to limit the invention unduly.

EXAMPLE I

A 75/25 butadiene/2-phenyl-4-hydroxy-1-butene rubber having a Mooney value (ML-4) of 56 was obtained by blending several butadiene/2-phenyl-4-hydroxy-1-butene copolymers which had been prepared by emulsion polymerization at 41° F. The combined 2-phenyl-4-hydroxy-1-butene in the rubber was approximately 10.7 weight percent (0.072 mols per 100 grams rubber).

Reaction products of hexamethylene diisocyanate and m-tolylene diisocyanate each with phenol and diphenylamine were used as curatives in the above-described rubber. Synthesis of these reaction products was accomplished by heating one mol of the diisocyanate with two mols of the phenol or amine in the presence of a few drops of triethylamine catalyst for 8 hours at 150° C. (302° F.). Nitrogen analyses are shown in Table I together with theoretical values:

*Table I*

| Curative number | Diisocyanate | Other compound | Nitrogen, weight percent | |
|---|---|---|---|---|
| | | | Found | Theoretical |
| 1 | Hexamethylene | Phenol | 7.8 | 7.9 |
| 2 | | Diphenylamine | 10.9 | 11.1 |
| 3 | m-Tolylene | Phenol | 10.9 | 7.7 |
| 4 | | Diphenylamine | | 10.9 |

The butadiene/2-phenyl-4-hydroxy-1-butene rubber was compounded in black and gum recipes using the formulations in Table II.

*Table II*

|  | Gum recipe |
|---|---|
| Rubber | grams__ 100 |
| Curative | mols__¹ 0.05 |

|  | Black recipe |
|---|---|
| Rubber | grams__ 100 |
| Carbon black (Philblack O) | do____ 50 |
| Circo-Para ² | do____ 10 |
| Curative: | |
| Mols | 0.03, 0.05, 0.07 0.09 |
| Mols per mol hydroxy group in copolymer | 0.42, 0.69, 0.97 1.25 |

¹ 0.69 mol per mol hydroxy group in copolymer.
² A blend containing equal parts of Circosol-2XH with Para Flux Circosol-2XH: Petroleum hydrocarbon softener containing hydrocarbons of high molecular weight, in the form of a heavy, viscous, transparent, pale green, odorless liquid of low volatility; sp. gr. 0.940; Saybolt Universal viscosity at 100° F., about 2,000 seconds. Para Flux: Saturated polymerized hydrocarbon The stocks were milled, cured for different lengths of time, and physical properties determined. Stocks in which diisocyanates alone are used as curatives instead of the reaction products herein described scorch almost instantaneously when the materials are milled. Such stocks are, therefore, not processable. Physical properties of the cured rubbers are shown in Tables III and IV.

*Table III.—Stress-Strain Properties (Original)*

Gum Recipe (No Black)

| Curative | | Compression set, percent | | | | 30' cure [2] | | | 60' cure [2] | | | 90' cure [2] | | | 120' cure [2] | | | Oven aged 24 hours, 212° F., 60' cure | | |
|---|---|---|---|---|---|---|---|---|---|---|---|---|---|---|---|---|---|---|---|---|
| No.[1] | Mols | 30' | 60' | 90' | 120' | 300% modulus, p.s.i. | Tensile, p.s.i. | Elongation, percent | 300% modulus, p.s.i. | Tensile, p.s.i. | Elongation, percent | 300% modulus, p.s.i. | Tensile, p.s.i. | Elongation, percent | 300% modulus, p.s.i. | Tensile, p.s.i. | Elongation, percent | 300% modulus, p.s.i. | Tensile, p.s.i. | Elongation, percent |
| 1 | 0.05 | | 4.3 | | | | | | 80 | 130 | | | | | | | | | 100 | 175 |
| 2 | 0.05 | | 13.4 | | | | | | 190 | 1,000 | | | | | | | | | 120 | 640 |
| 3 | 0.05 | | 3.3 | | | | | | | | | | | | | | | | | |
| 4 | 0.05 | | 4.8 | | | | | | 170 | 225 | | | | | | | | | 120 | 190 |

Black Recipe

| 1 | 0.03 | 31.5 | 10.3 | 5.4 | 3.6 | (3) | (3) | (3) | | | | | 1,500 | 230 | (3) | (3) | (3) | | 810 | 110 |
| 1 | 0.05 | 22.6 | 8.1 | 4.7 | 3.1 | 870 | 1,500 | 450 | 1,400 | 1,720 | 370 | | 1,580 | 225 | (3) | (3) | (3) | | 900 | 100 |
| 1 | 0.07 | 22.2 | 7.3 | 4.4 | 3.2 | 1,270 | 2,225 | 500 | 1,575 | 1,675 | 320 | | 1,650 | 240 | | 1,410 | 205 | | 1,090 | 95 |
| 1 | 0.09 | 16.0 | 6.6 | 4.7 | 3.5 | 1,180 | 1,700 | 410 | 1,640 | 1,570 | 330 | | 1,350 | 220 | | 1,700 | 255 | | 975 | 90 |
| 2 | 0.03 | 21.4 | 10.0 | 5.4 | 3.8 | 150 | 550 | 960 | 520 | 1,690 | 700 | 1,025 | 2,200 | 570 | (3) | (3) | (3) | 1,590 | 2,520 | 420 |
| 2 | 0.05 | 17.9 | 10.1 | 4.9 | 4.1 | 140 | 775 | 865 | 520 | 1,990 | 780 | 900 | 2,300 | 625 | 1,150 | 2,200 | 510 | 1,490 | 2,360 | 455 |
| 2 | 0.07 | 17.5 | 10.1 | 6.1 | 4.3 | 120 | 750 | 860 | 440 | 1,880 | 765 | 810 | 2,150 | 655 | 1,040 | 2,060 | 525 | 1,300 | 2,670 | 520 |
| 2 | 0.09 | 24.9 | 11.1 | 8.2 | 6.7 | 100 | 680 | 920 | 380 | 1,400 | 665 | 670 | 1,775 | 610 | 925 | 1,625 | 460 | 1,210 | 2,120 | 460 |
| 3 | 0.03 | 7.4 | 3.9 | 3.3 | 2.6 | (3) | (3) | (3) | | | | | 1,320 | 125 | | 1,425 | 120 | | 1,340 | 110 |
| 3 | 0.07 | 6.6 | 4.5 | 3.6 | 3.8 | | 1,825 | 185 | | 1,620 | 135 | | 1,720 | 135 | | 1,740 | 130 | | 1,280 | 90 |
| 3 | 0.09 | 5.8 | 4.3 | 3.4 | 3.5 | | 1,950 | 220 | | 1,920 | 195 | | 1,980 | 175 | | 2,050 | 185 | | 1,700 | 110 |
| 4 | 0.03 | 12.0 | 4.3 | 2.8 | 2.4 | 1,580 | 2,500 | 415 | | 1,780 | 200 | | 1,570 | 140 | (3) | (3) | (3) | | | |
| 4 | 0.05 | 12.4 | 4.7 | 2.9 | 2.7 | 1,660 | 1,950 | 360 | | 1,410 | 150 | | 1,660 | 140 | (3) | (3) | (3) | | 1,590 | 120 |
| 4 | 0.07 | 13.0 | 5.1 | 3.5 | 3.1 | 1,625 | 1,700 | 315 | | 1,520 | 165 | | 1,350 | 125 | | 1,320 | 135 | | 1,900 | 125 |
| 4 | 0.09 | 13.7 | 5.8 | 3.6 | 3.0 | 1,600 | 1,990 | 360 | | 1,500 | 175 | | 1,400 | 160 | | 1,380 | 145 | | 1,720 | 135 |

[1] No. 1. Hexamethylene diisocyanate—phenol reaction product, No. 2. Hexamethylene diisocyanate—diphenylamine reaction product, No. 3. m-Tolylene diisocyanate—phenol reaction product, No. 4. m-Tolylene diisocyanate—diphenylamine reaction product.
[2] Cured at 307° F.  [3] Poor slab.

*Table IV*

Gum Recipe (No black)

| Curative | | Hysteresis properties | | | | | | | | | | |
|---|---|---|---|---|---|---|---|---|---|---|---|---|
| | | 30' cure | | | | 60' cure | | | | 90' cure | | | |
| | | Δ TF | | Resilience, percent | | Δ TF | | Resilience, percent | | Δ TF | | Resilience, percent | |
| No.[1] | Mols | Orig. | Aged | Orig. | Aged | Orig. | Aged | Orig. | Aged | Orig. | Aged | Orig. | Aged |
| 1 | 0.05 | | | | | | | | | | | | |
| 2 | 0.05 | | | | | (2) | (2) | 51.9 | 57.1 | | | | |
| 3 | 0.05 | | | | | 27.4 | 24.7 | 75.6 | 81.4 | | | | |
| 4 | 0.05 | | | | | 13.5 | 16.9 | 87.6 | 87.8 | | | | |

Black Recipe

| 1 | 0.03 | (3) | (3) | (3) | | 84.5 | 52.7 | 54.9 | 71.8 | 63.2 | 47.3 | 64.5 | 72.2 |
| 1 | 0.05 | 130.1 | | 47.8 | | 57.1 | 39.9 | 60.4 | 73.1 | 46.9 | 39.2 | 69.0 | 74.5 |
| 1 | 0.07 | 72.3 | 37.5 | 52.7 | 70.7 | 44.6 | 35.5 | 63.2 | 74.3 | 38.5 | 34.1 | 69.7 | 75.6 |
| 1 | 0.09 | 65.2 | 38.1 | 53.4 | 69.5 | 45.3 | 35.1 | 61.4 | 70.0 | 37.1 | 33.8 | 67.7 | 71.3 |
| 2 | 0.03 | (2) | (2) | 44.0 | | 127.5 | | 51.2 | | 77.1 | 62.2 | 56.1 | 63.1 |
| 2 | 0.05 | (2) | (2) | 41.1 | | 102.0 | 62.5 | 49.8 | 57.9 | 65.2 | 49.7 | 56.8 | 60.5 |
| 2 | 0.07 | (2) | (2) | 36.7 | | (2) | 58.1 | 45.1 | 51.9 | 60.2 | 48.3 | 54.2 | 55.2 |
| 2 | 0.09 | (2) | (2) | 29.0 | 40.6 | (2) | 61.2 | 39.4 | 43.6 | 65.2 | 50.0 | 47.8 | 47.1 |
| 3 | 0.03 | 41.9 | 33.8 | 75.3 | 79.7 | (4) | (4) | (4) | (4) | 32.8 | 32.8 | 80.0 | 80.6 |
| 3 | 0.07 | 38.1 | 37.1 | 72.2 | 72.0 | 34.1 | 36.5 | 77.0 | 72.3 | 34.8 | 36.5 | 77.5 | 73.4 |
| 3 | 0.09 | 40.5 | 41.5 | 68.2 | 66.0 | 35.8 | 44.2 | 71.6 | 67.3 | 35.1 | 43.3 | 72.4 | 66.2 |
| 4 | 0.03 | 58.5 | 40.2 | 63.8 | 75.4 | 38.5 | 37.8 | 76.7 | 77.3 | 34.1 | 36.5 | 79.2 | 79.4 |
| 4 | 0.05 | 57.5 | 40.5 | 59.6 | 72.2 | 37.5 | 37.1 | 74.3 | 75.4 | 35.5 | 34.4 | 77.6 | 76.5 |
| 4 | 0.07 | 55.4 | 42.9 | 56.7 | 68.5 | 38.8 | 40.9 | 70.7 | 70.5 | 35.8 | 42.9 | 74.7 | 70.8 |
| 4 | 0.09 | 58.8 | 48.3 | 53.7 | 65.0 | 39.5 | 45.9 | 66.6 | 65.2 | 36.1 | 43.9 | 70.7 | 66.4 |

See footnotes at end of table.

Table IV—Continued

Gum Recipe (No black)—Continued

| Curative | | Hysteresis properties—Continued | | | | Shore hardness | | | | Comp. MS 1½ | Scorch at 280° F. | |
|---|---|---|---|---|---|---|---|---|---|---|---|---|
| | | 120′ cure | | | | Cure time | | | | | Minimum Mooney | Minutes to scorch |
| | | Δ TF | | Resilience, percent | | 30′ | 60′ | 90′ | 120′ | | | |
| No.[1] | Mols | Orig. | Aged | Orig. | Aged | | | | | | | |
| 1 | 0.05 | | | | | | | | | 39.5 | | |
| 2 | 0.05 | | | | | | | | | 21 | | |
| 3 | 0.05 | | | | | | | | | 51 | | |
| 4 | 0.05 | | | | | | | | | 40 | | |

Black Recipe—Continued

| 1 | 0.03 | 52.1 | 42.6 | 68.3 | 73.3 | 51 | 52 | 54 | 57 | 31.5 | 28 | 20 |
|---|---|---|---|---|---|---|---|---|---|---|---|---|
| 1 | 0.05 | 40.5 | 37.5 | 73.1 | 75.3 | 61 | 58 | 56 | 58 | 34 | 26 | 16.5 |
| 1 | 0.07 | 33.8 | 33.8 | 75.0 | 76.1 | 63 | 61.5 | 60 | 58 | 36 | 23.5 | 11.5 |
| 1 | 0.09 | 34.1 | 33.8 | 70.1 | 71.6 | 67 | 66 | 64 | 63 | 37.5 | 19 | 10 |
| 2 | 0.03 | 62.5 | 53.4 | 61.3 | 66.2 | 38 | 42 | 46 | 49 | 29.5 | 30 | 19 |
| 2 | 0.05 | 53.7 | 48.3 | 61.6 | 63.9 | 37 | 41.5 | 46 | 48 | 26.5 | 26.5 | 14 |
| 2 | 0.07 | 50.0 | 42.6 | 59.7 | 59.2 | 35 | 39 | 42 | 46 | 26 | 27 | 15.5 |
| 2 | 0.09 | 51.7 | 43.9 | 54.3 | 51.2 | 34 | 37 | 40 | 44 | 23 | 22 | 16 |
| 3 | 0.03 | 32.5 | 32.8 | 82.0 | 80.8 | 65 | 69 | 71 | 72 | 34.5 | 41 | 5 |
| 3 | 0.07 | 31.8 | 32.5 | 79.7 | 74.1 | 67 | 70 | 71 | 72 | 38.5 | 44 | 5 |
| 3 | 0.09 | 33.8 | 43.3 | 73.9 | 67.5 | 65 | 67 | 68 | 69 | 39 | 40 | 4.5 |
| 4 | 0.03 | 33.8 | 34.8 | 80.0 | 79.9 | 56 | 64 | 68 | 70 | 36 | 34 | 12 |
| 4 | 0.05 | 35.1 | 33.8 | 78.8 | 77.7 | 57 | 66 | 70 | 71 | 37 | 31.5 | 12 |
| 4 | 0.07 | 35.1 | 38.1 | 76.2 | 72.6 | 61 | 66 | 69 | 71 | 41 | 30 | 13.5 |
| 4 | 0.09 | 34.4 | 45.9 | 72.4 | 66.9 | 63 | 67 | 69 | 70 | 42 | 27.5 | 14 |

[1] Curatives as in preceding table.   [2] Too soft.   [3] Poor pellet.   [4] No pellet.

EXAMPLE II

Reaction products of p,p′-diphenylmethane diisocyanate with phenol, diphenylamine, and acetanilide, and of hexamethylene diisocyanate and m-tolylene diisocyanate with acetanilide were prepared by heating one mol of the diisocyanate with two mols of the phenol, amine, or acetanilide in the presence of a few drops of triethylamine catalyst for 8 hours at 150° C. (302° F.). Nitrogen analyses are shown in Table V together with theoretical values:

Table V

| Diisocyanate | Other compound | Nitrogen, weight percent | |
|---|---|---|---|
| | | Found | Theoretical |
| p,p′-Diphenylmethane | Phenol | | 6.4 |
| | Diphenylamine | 9.3 | 9.5 |
| | Acetanilide | 10.4 | 10.8 |
| Hexamethylene | do | 13.3 | 12.8 |
| m-Tolylene | do | 10.3 | 12.9 |

A 75/25 butadiene/2-phenyl-4-hydroxy-1-butene rubbery copolymer similar to that described in Example I was compounded in the following manner using the above-described reaction products as curatives:

| | | |
|---|---|---|
| Rubbery copolymer | grams | 100 |
| Philblack O | do | 50 |
| Curative | mols | 0.05 |

The stocks were milled, cured 60 minutes at 307° F., and physical properties determined. Milling was easy in all cases. Results are shown in Table VI.

When diisocyanates are used as curatives instead of the reaction products described above, they cause almost immediate scorch when milled into the butadiene/2-phenyl-4-hydroxy-1-butene rubber.

EXAMPLE III

The reaction product of one mol of p-p′-diphenylmethane diisocyanate with two mols of p,p′-dimethoxydiphenylamine was used as a curative for a 75/25 butadiene/2-phenyl-4-hydroxy-1-butene rubber similar to that described in Example I. The compounding recipe was as follows:

| | | |
|---|---|---|
| Rubbery copolymer | grams | 100 |
| Philblack O | do | 50 |
| Curative | mols | 0.05 |

The stock was milled, cured 60 minutes at 307° F., and physical properties determined. Results were as follows:

| | | |
|---|---|---|
| Compression set | percent | 9.3 |
| 300% modulus | p.s.i. | 1400 |
| Tensile | p.s.i. | 2200 |
| Elongation | percent | 420 |
| ΔTF | | 89.6 |
| Permanent set | percent | 3.8 |
| Resilience | do | 60.6 |
| Shore hardness | | 60 |

EXAMPLE IV

Reaction products of one mol of m-tolylene diisocyanate with two mols each of various compounds containing active hydrogen were prepared and used as curatives for the 75/25 butadiene/2-phenyl-4-hydroxy-1-butene rubber described in Example I. The compounding recipe was the same as that given in the preceding example. The stocks

Table VI

| Diisocyanate | Other compound | Compression set, percent | Tensile, p.s.i. | Elongation, percent | ΔTF | Permanent set, percent | Resilience, percent | Shore hardness |
|---|---|---|---|---|---|---|---|---|
| p,p′-Diphenylmethane | Phenol | 10.5 | (1) | (1) | 52.4 | 0.2 | 71.3 | 71 |
| | Diphenylamine | 6.5 | 1,730 | 100 | 36.5 | 0.1 | 75.4 | 70 |
| | Acetanilide | 32.6 | (1) | (1) | (2) | (2) | 50.9 | 55 |
| Hexamethylene | do | 24.8 | 2,260 | 140 | (2) | (2) | 51.8 | 58 |
| m-Tolylene | do | 11.0 | 2,080 | 280 | 115.0 | 34.4 | 55.7 | 61 |

[1] Poor slab.   [2] Too soft.

were milled, cured 60 minutes at 307° F., and physical properties determined. No odor or handling problems were encountered during milling or curing of the stocks. Results were as follows:

*Table VII*

| Compound reacted with m-tolylene diisocyanate | Comp. set, percent | 300% modulus, p.s.i. | Tensile, p.s.i. | Elongation percent | ΔTF | Permanent set, percent | Resilience, percent | Shore hardness |
|---|---|---|---|---|---|---|---|---|
| Di-n-butylamine | 6.3 | 1,020 | 2,800 | 510 | 77.7 | 3.0 | 56.6 | 50 |
| Piperidine | 12.6 | 780 | 1,240 | 500 | 169.6 | 40.2 | 47.4 | 63 |
| Morpholine | 16.4 | 390 | 580 | 590 | (¹) | (¹) | 46.1 | 58 |
| Phenyl-beta-naphthylamine | 6.7 | 2,400 | 2,900 | 360 | 57.5 | 0.8 | 64.1 | 64 |
| Phthalimide | 13.6 | -------- | 2,450 | 120 | 55.8 | 0.7 | 66.9 | 76 |

¹ Pellet split.

The reaction product of m-tolylene diisocyanate with lauryl alcohol was tried as a curative using the procedure described above. Very little, if any, curing was obtained after 60 minutes at 307° F. as evidenced by a compression set value of 46.7 percent.

EXAMPLE V

The reaction product of m-tolylene diisocyanate with phthalimide, described in Example IV, was employed as a curative for the 75/25 butadiene/2-phenyl-4-hydroxy-1-butene rubber of Example I using the following conventional compounding recipe containing sulfur:

| | Parts by weight |
|---|---|
| Copolymer | 100 |
| Philblack O (carbon black) | 50 |
| Circo-Para ¹ | 10 |
| Sulfur | 1.75 |
| Zinc oxide | 3 |
| Stearic acid | 1 |
| Flexamine ² | 1 |
| Santocure ³ | 1 |
| Curative ⁴ | 23 |

¹ As in Example I.
² Physical mixture containing 65 percent of a complex diarylamineketone reaction product and 35 percent of N,N'-diphenyl-p-phenylenediamine.
³ N-cyclohexyl-2-benzothiazylsulfenamide.
⁴ 0.05 mol per 100 grams rubber.

The rubber was milled, cured at 307° F., and physical properties determined. Results were as follows:

| | Cure time, minutes | |
|---|---|---|
| | 30 | 60 |
| Compression set, percent | 19.7 | 8.8 |
| Tensile, p.s.i., original | 1,400 | 1,600 |
| Elongation, percent, original | 110 | 140 |
| 200° F. maximum hot tensile, p.s.i. | 850 | -------- |
| Tensile, p.s.i., oven aged 24 hrs. at 212° F. | 1900 | -------- |
| Elongation, percent, oven aged 24 hrs. at 212° F. | 110 | -------- |
| Δ TF | 58.8 | 50.7 |
| Resilience, percent | 65.9 | 68.1 |
| Shore hardness | 72 | 73.5 |

The corresponding run with the same curative in a sulfur-free curing system is given in Example IV.

Variations and modifications are possible within the scope of the foregoing disclosure and discussion, the essence of which is that the processing of hydroxy-containing polymeric materials can be improved by the incorporation into the unvulcanized or uncured polymeric composition, without the tendency for premature vulcanization to occur, a novel vulcanizing agent comprising the reaction product of polyisocyanates with active hydrogen-containing compounds.

Having described our invention we claim:

1. In a method for producing a synthetic copolymer, wherein said copolymer is prepared by polymerizing from 50 to 98 parts by weight per 100 parts by weight of monomeric material of 1,3-butadiene and 2-phenyl-4-hydroxy butene, the latter monomer being employed in an amount sufficient to yield a copolymer containing at least 0.009 mol of hydroxy group per 100 grams of copolymer, and said copolymer is subjected to milling and subsequent vulcanization, said copolymer being reactive with a polyisocyanate, the improvement which comprises adding to said composition during said milling a reaction product of m-tolylene diisocyanate with at least a stoichiometric amount of diphenylamine per mol of said diisocyanate, said reaction product being employed in an amount in the range of 0.13 to 5 mols per mol of hydroxy group in said copolymer.

2. A millable and vulcanizable rubber mix comprising a copolymer prepared by polymerizing from 50 to 98 parts by weight per 100 parts by weight of monomeric material of a conjugated diene having 4 to 8 carbon atoms per molecule with a hydroxy-containing monomer having a $CH_2=C<$ group, said hydroxy-containing monomer being employed in an amount sufficient to yield a copolymer having at least 0.009 mol of hydroxy group per 100 grams of copolymer, said copolymer being reactive with a polyisocyanate, and a vulcanizing agent comprising the reaction product of m-tolylene diisocyanate with at least a stoichiometric amount of diphenylamine per mol of said diisocyanate, said reaction product being employed in an amount in the range of 0.13 to 5 mols per mol of hydroxy group in the copolymer.

References Cited in the file of this patent

UNITED STATES PATENTS

| 2,381,063 | Kung | Aug. 7, 1945 |
| 2,683,727 | Masten | July 13, 1954 |
| 2,683,728 | Masten | July 13, 1954 |

FOREIGN PATENTS

| 574,901 | Great Britain | Jan. 25, 1946 |
| 150,416 | Australia | May 3, 1951 |